US009156525B2

(12) United States Patent
Emura et al.

(10) Patent No.: US 9,156,525 B2
(45) Date of Patent: Oct. 13, 2015

(54) FRONT DERAILLEUR (71) Applicant: Shimano Inc., Sakai, Osaka (JP)

(72) Inventors: Atsuhiro Emura, Osaka (JP); Kazuya Kuwayama, Osaka (JP); Kenkichi Inoue, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/294,469

(22) Filed: Jun. 3, 2014

(65) Prior Publication Data

US 2015/0018146 A1  Jan. 15, 2015

(30) Foreign Application Priority Data

Jul. 11, 2013 (JP) ................................. 2013-145426

(51) Int. Cl.
*F16H 9/00* (2006.01)
*F16H 59/00* (2006.01)
*F16H 61/00* (2006.01)
*F16H 63/00* (2006.01)
*B62M 9/1342* (2010.01)
*B62M 9/135* (2010.01)

(52) U.S. Cl.
CPC ............. *B62M 9/1342* (2013.01); *B62M 9/135* (2013.01)

(58) Field of Classification Search
CPC ...... B62M 9/135; B62M 9/136; B62M 9/132; B62M 25/08; B62M 9/1342
USPC ....................................................... 474/80, 82
See application file for complete search history.

(56) References Cited

U.S. PATENT DOCUMENTS

| 3,730,012 | A | * | 5/1973 | Juy | 474/82 |
| 4,030,374 | A | * | 6/1977 | Isobe | 474/82 |
| 4,199,997 | A | * | 4/1980 | Isobe | 474/82 |
| 4,199,998 | A | * | 4/1980 | Isobe | 474/82 |
| 4,223,562 | A | * | 9/1980 | Nagano et al. | 474/82 |
| 4,424,048 | A | * | 1/1984 | Shimano | 474/82 |
| 4,486,182 | A | * | 12/1984 | Coue | 474/80 |
| 4,604,078 | A | * | 8/1986 | Nagano | 474/80 |
| 4,894,046 | A | * | 1/1990 | Browning | 474/78 |
| 5,607,367 | A | * | 3/1997 | Patterson | 474/80 |
| 5,649,877 | A | * | 7/1997 | Patterson | 474/80 |
| 5,846,148 | A | * | 12/1998 | Fujii | 474/80 |
| 6,277,044 | B1 | * | 8/2001 | Fujimoto | 474/80 |
| 6,902,503 | B2 | * | 6/2005 | Nanko | 474/80 |
| 6,979,009 | B2 | * | 12/2005 | Ichida et al. | 280/238 |
| 7,081,058 | B2 | * | 7/2006 | Nankou | 474/80 |
| 7,186,194 | B2 | * | 3/2007 | Nankou | 474/80 |
| 7,291,079 | B2 | * | 11/2007 | Ichida et al. | 474/80 |

(Continued)

FOREIGN PATENT DOCUMENTS

JP          57-57194 U    4/1982
JP       2007-186176 A    7/2007

*Primary Examiner* — Henry Liu
(74) *Attorney, Agent, or Firm* — Global IP Counselors (57) ABSTRACT

A front derailleur is attachable to a bicycle with a frame in which a fixing bore is provided. The front derailleur basically includes a base member, a chain guide and a link mechanism. The base member has an attaching bore for attaching the base member to a fixing bore of a frame by a fastening member. The chain guide configured to guide a chain. The link mechanism movably couples the chain guide to the base member. The base member is disposed with respect to the chain guide such that at least a part of the attaching bore is disposed in front of the chain guide and above the chain guide while the front derailleur is in a state in which the base member is attached to the frame.

18 Claims, 7 Drawing Sheets

(56) References Cited

U.S. PATENT DOCUMENTS

| | | | |
|---|---|---|---|
| 7,306,531 B2* | 12/2007 | Ichida et al. | 474/70 |
| 7,503,863 B2* | 3/2009 | Ichida et al. | 474/80 |
| 7,651,424 B2* | 1/2010 | Yamamoto et al. | 474/82 |
| 7,704,172 B2* | 4/2010 | Tetsuka et al. | 474/80 |
| 7,704,173 B2* | 4/2010 | Ichida et al. | 474/82 |
| 7,722,487 B2* | 5/2010 | Ichida et al. | 474/80 |
| 7,867,118 B2* | 1/2011 | Yamamoto et al. | 474/80 |
| 8,025,597 B2* | 9/2011 | Takamoto | 474/70 |
| 8,029,396 B2* | 10/2011 | Valle et al. | 474/82 |
| 8,282,519 B2* | 10/2012 | Ichida et al. | 474/82 |
| 8,574,105 B2* | 11/2013 | Auer | 474/82 |
| 8,678,963 B2* | 3/2014 | Kuwayama et al. | 474/80 |
| 8,808,123 B2* | 8/2014 | Inoue et al. | 474/80 |
| 8,864,611 B2* | 10/2014 | Kuwayama et al. | 474/80 |
| 8,888,620 B2* | 11/2014 | Emura et al. | 474/80 |
| 2004/0171446 A1* | 9/2004 | Nanko | 474/80 |
| 2004/0185975 A1* | 9/2004 | Chen | 474/80 |
| 2005/0143206 A1* | 6/2005 | Tetsuka et al. | 474/80 |
| 2005/0192137 A1* | 9/2005 | Ichida et al. | 474/70 |
| 2005/0192139 A1* | 9/2005 | Ichida et al. | 474/80 |
| 2005/0197222 A1* | 9/2005 | Tatsumi | 474/80 |
| 2005/0205323 A1* | 9/2005 | Ichida et al. | 180/205 |
| 2006/0189421 A1* | 8/2006 | Ichida et al. | 474/80 |
| 2006/0189422 A1* | 8/2006 | Ichida et al. | 474/80 |
| 2006/0258494 A1* | 11/2006 | Auer | 474/80 |
| 2007/0060427 A1* | 3/2007 | Nankou | 474/80 |
| 2007/0117666 A1* | 5/2007 | Ichida et al. | 474/80 |
| 2007/0178998 A1* | 8/2007 | Tetsuka | 474/80 |
| 2007/0191158 A1* | 8/2007 | Ichida et al. | 474/80 |
| 2007/0293359 A1* | 12/2007 | Yamamoto et al. | 474/80 |
| 2008/0026888 A1* | 1/2008 | Yamamoto et al. | 474/80 |
| 2008/0132364 A1* | 6/2008 | Ichida et al. | 474/70 |
| 2008/0182689 A1* | 7/2008 | Fujii et al. | 474/82 |
| 2008/0305902 A1* | 12/2008 | Tetsuka et al. | 474/80 |
| 2011/0230287 A1* | 9/2011 | Savola et al. | 474/80 |
| 2012/0157250 A1* | 6/2012 | Jordan | 474/80 |
| 2012/0295745 A1* | 11/2012 | Emura et al. | 474/80 |
| 2013/0072333 A1* | 3/2013 | Kuwayama et al. | 474/82 |
| 2013/0085024 A1* | 4/2013 | Inoue et al. | 474/80 |
| 2014/0155205 A1* | 6/2014 | Kuwayama et al. | 474/80 |
| 2014/0315671 A1* | 10/2014 | Lazzarin | 474/80 |
| 2014/0323254 A1* | 10/2014 | Kuwayama et al. | 474/80 |
| 2014/0349793 A1* | 11/2014 | Emura et al. | 474/80 |

* cited by examiner

FRONT DERAILLEUR

CROSS-REFERENCE TO RELATED APPLICATIONS

This application claims priority to Japanese Patent Application No. 2013-145426, filed on Jul. 11, 2013 in Japan. The entire disclosure of Japanese Patent Application No. 2013-145426 is hereby incorporated herein by reference.

BACKGROUND

1. Field of the Invention

This invention generally relates to a front derailleur. More specifically, the present invention relates to a front derailleur which is attachable to a bicycle with a crank axis.

2. Background Information

Generally, a front derailleur has a base member which is attachable to a frame of a bicycle, a chain guide which guides a chain, and a link mechanism which movably couples the chain guide to the base member (for example, see Japanese Laid-Open Utility Model Publication No. S57-57194 and Japanese Laid-Open Patent Publication No. 2007-186176). In this conventional front derailleur, a rear wheel of the bicycle is disposed rearward of the base member. In recent years, it has been proposed that a rear wheel of a larger diameter is used for a bicycle in terms of the traveling performance.

SUMMARY

Generally, the present disclosure is directed to various features of a front derailleur. When a rear wheel of a bicycle has a large diameter, there is a possibility that the space between a base member of the front derailleur and the rear wheel will be decreased.

One object of the present invention is to provide a front derailleur which can obtain a sufficient space between a base member and a rear wheel even when a rear wheel of a large diameter is used.

In accordance with an aspect of the present invention, a front derailleur is provided for mounting to a bicycle. The front derailleur comprises a base member, a chain guide and a link mechanism. The base member has an attaching bore for attaching the base member to a fixing bore of a frame of the bicycle by a fastening member. The chain is configured to guide a chain. The link mechanism movably couples the chain guide to the base member. The base member is disposed with respect to the chain guide such that at least a part of the attaching bore is disposed in front of the chain guide and above the chain guide while the front derailleur is in a state in which the base member is attached to the frame.

With this front derailleur, since at least a part of the attaching bore is disposed on the front side and the upper side with respect to the chain guide, even though the chain guide is disposed in the same position as a chain guide of a conventional front derailleur, the base member can be fixed to the frame at a location further forward as compared to a base member of the conventional front derailleur. Therefore, even when a rear wheel of a large diameter is used, a sufficient space can be obtained between the base member and the rear wheel.

The attaching bore is entirely disposed in front of the chain guide and above the chain guide while the front derailleur is in the state in which the base member is attached to the frame. In this case, since the entire attaching bore is disposed on the upper side with respect to the chain guide, the base member can be provided at a location even further forward. Therefore, even when a rear wheel of a large diameter is used, a sufficient space can be more securely obtained between the base member and the rear wheel.

In accordance with another aspect of the present invention, a front derailleur is for mounting to a bicycle. The front derailleur comprises a base member, a chain guide and a link mechanism. The base member has an attaching bore for attaching the base member to a fixing bore of a frame of the bicycle by a fastening member. The chain guide is configured to guide a chain. The link mechanism movably couples the chain guide to the base member. The link mechanism includes a first link member pivotally arranged about a first link axis with respect to the base member and pivotally arranged about a second link axis with respect to the chain guide. The base member is disposed with respect to the chain guide such that at least a part of the attaching bore is disposed in front of the first link axis and above the first link axis while the front derailleur is in a state in which the base member is attached to the frame.

With this front derailleur, since at least a part of the attaching bore is disposed on the front side and the upper side with respect to the first link axis, even though the chain guide is disposed in the same position as a chain guide of a conventional front derailleur, the base member can be fixed to the frame at a location further forward as compared to a base member of the conventional front derailleur. Therefore, even when a rear wheel of a large diameter is used, a sufficient space can be obtained between the base member and the rear wheel.

The attaching bore is at least partially disposed in front of the second link axis and above the second link axis while the front derailleur is in the state in which the base member is attached to the frame. In this case, even when a rear wheel of a large diameter is used, a sufficient space can be more securely obtained between the base member and the rear wheel.

The link mechanism may further include a second link member pivotally arranged about a third link axis with respect to the base member and pivotally arranged about a fourth link axis with respect to the chain guide. In this case, a four-bar link mechanism can be constructed by the base member, the first link member, the second link member and the chain guide, so that the chain guide can be moved more stably.

The attaching bore is at least partially disposed in front of the third link axis and above the third link axis while the front derailleur is in the state in which the base member is attached to the frame. In this case, even when a rear wheel of a large diameter is used, a sufficient space can be more securely obtained between the base member and the rear wheel.

The attaching bore is at least partially disposed in front of the fourth link axis and above the fourth link axis while the front derailleur is in the state in which the base member is attached to the frame. In this case, even when a rear wheel of a large diameter is used, a sufficient space can be more securely obtained between the base member and the rear wheel.

The attaching bore is entirely disposed in front of the chain guide and above the first, second and third link axes while the front derailleur is in the state in which the base member is attached to the frame. In this case, even when a rear wheel of a large diameter is used, a sufficient space can be more securely obtained between the base member and the rear wheel.

The first, second, third and fourth link axes are arranged to be inclined in a range of 80 degrees to 100 degrees in a chain ring driving rotation direction with respect to a first plane that includes a rear hub axis and a crank axis while the front derailleur is in the state in which the base member is attached to the frame.

In this case, the first through fourth link axes are arranged to be inclined in the range of 80 degrees to 100 degrees in the driving rotation direction of the chain ring with respect to the first plane including the rear hub axis and the crank axis. Therefore, the front portion of the base member can be made compact along the chain line. Further, the entire front derailleur can be configured to be compact.

The first, second, third and fourth link axes have the same angle with respect to the first plane. In this case, the chain guide can be moved smoothly and stably by the four-bar link mechanism.

In accordance with yet another aspect of the present invention, a front derailleur is provided for mounting to a bicycle. The front derailleur comprises a base member, a chain guide and a link mechanism. The base member has an attaching bore for attaching the base member to a fixing bore of a frame of the bicycle by a fastening member. The chain guide is configured to guide a chain. The link mechanism movably couples the chain guide to the base member. The base member is disposed with respect to the chain guide such that the attaching bore is located in a range of 70 degrees to 90 degrees in a chain ring driving rotation direction around a crank axis with respect to a first plane including a rear hub axis and a crank axis while the front derailleur is in a state in which the base member is attached to the frame and in which the chain guide does not interfere with a chain ring rotatably disposed on the crank axis.

With this front derailleur, since the base member is disposed such that the attaching bore is located in the range of 70 degrees to 90 degrees in the driving rotation direction of the chain ring around the crank axis with respect to the first plane in the state, even though the chain guide is disposed in the same position as a chain guide of a conventional front derailleur, the base member can be fixed to the frame at a location further forward as compared to a base member of the conventional front derailleur. Therefore, even when a rear wheel of a large diameter is used, a sufficient space can be obtained between the base member and the rear wheel.

In accordance with yet another aspect of the present invention, a front derailleur is provided for mounting to a bicycle. The front derailleur comprises a base member, a chain guide, and a link mechanism. The base member has an attaching bore for attaching the base member to a fixing bore of a frame of the bicycle by a fastening member. The chain guide is configured to guide a chain. The link mechanism movably couples the chain guide to the base member. The base member is disposed with respect to the chain guide such that the attaching bore is located in a range of forty-five millimeters or less rearward of a second plane which is perpendicular to a first plane that includes a rear hub axis and a crank axis while the front derailleur is in a state in which the base member is attached to the frame and in which the chain guide does not interfere with a chain ring rotatably disposed on the crank axis.

With this front derailleur, since the base member is disposed such that the attaching bore is located in the range of 45 mm or less rearward of the second plane, even though the chain guide is disposed in the same position as a chain guide of a conventional front derailleur, the base member can be fixed to the frame at a location further forward as compared to a base member of the conventional front derailleur. Therefore, even when a rear wheel of a large diameter is used, a sufficient space can be obtained between the base member and the rear wheel.

Even when a rear wheel of a large diameter is used, a sufficient space can be obtained between the base member and the rear wheel.

Also other objects, features, aspects and advantages of the disclosed front derailleur will become apparent to those skilled in the art from the following detailed description, which, taken in conjunction with the annexed drawings, discloses one embodiment of the front derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
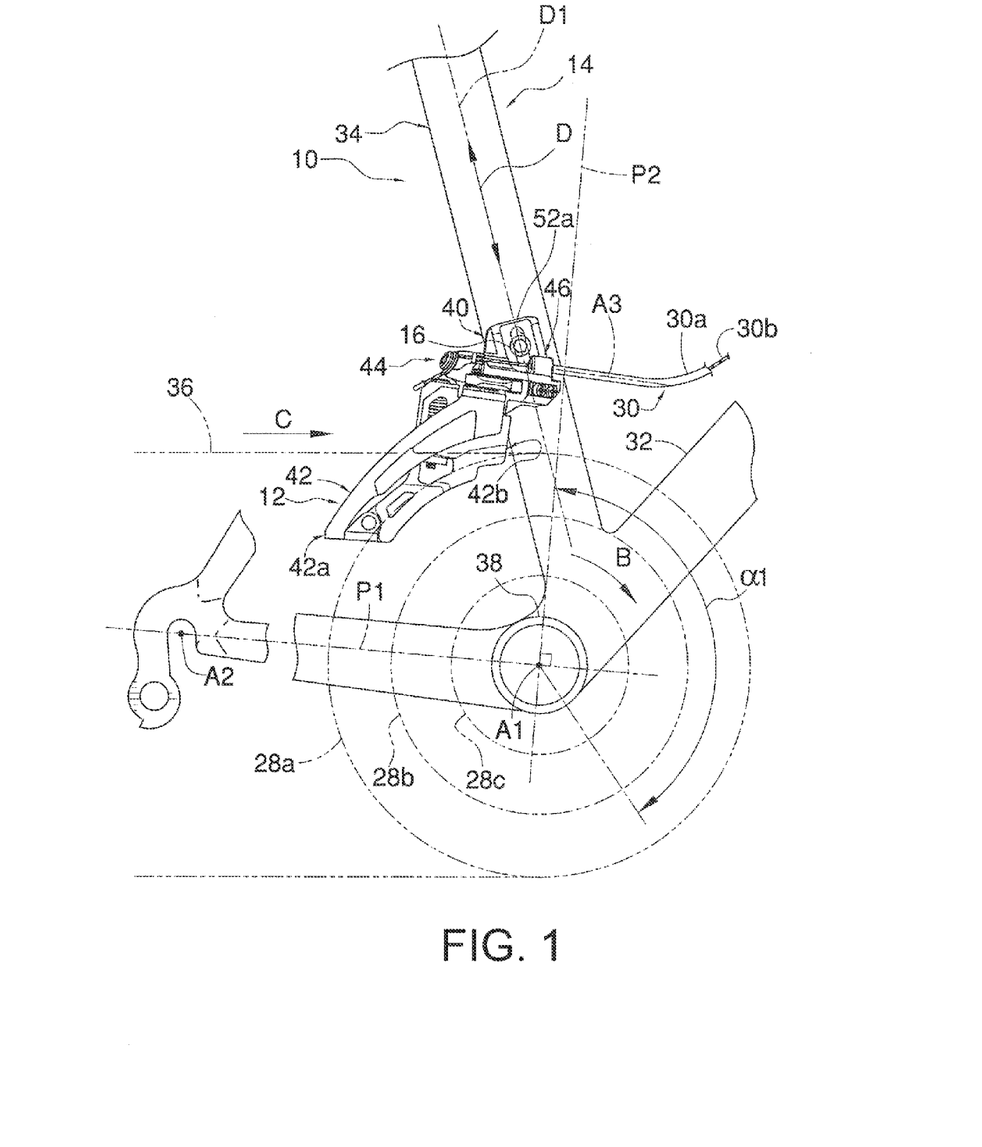
FIG. 1 is a right side elevational view of a portion of a bicycle that is equipped with a front derailleur in accordance with one illustrated embodiment and showing the front derailleur is in a state in which a base member is attached to a frame as viewed in side elevational view of the bicycle.

Referring initially to FIG. 1, a bicycle 10 is illustrated that is equipped with a front derailleur 12 in accordance with a first embodiment. In FIG. 1, a bicycle 10 is equipped with a frame 14 which includes a seat tube 34, a crank axis A1, a rear hub axis A2, and the front derailleur 12 in accordance with an embodiment of the present invention. The crank axis A1 and the rear hub axis A2 are arranged parallel to each other. The front derailleur 12 is detachably mounted on the seat tube 34 of the frame 14. A shift operation is conducted to the front derailleur 12 by an operation device which is mounted on a handlebar of the bicycle 10 through an operation cable 30 (the operation device and the handlebar are not illustrated in the drawing).

The operation cable 30 includes an outer casing 30a and an inner cable 30b which can pass through the outer casing 30a. The operation cable 30 is a conventional Bowden cable. The inner cable 30b is slidable inside the outer casing 30a. For example, the operation cable 30 is arranged inside a down tube 32 of the frame 14. The operation cable 30 is then taken from inside the down tube 32 in the middle and coupled to the front derailleur 12. Here, the words "front", "rear", "left", "right", "up", and "down", and synonymous words thereof refer to "front", "rear", "left", "right", "up", and "down" as seen from a rider who is seated on a saddle and faces a handlebar (either is not illustrated in the drawing).

The front derailleur 12 is mounted on the seat tube 34 in the illustrated embodiment. However, the front derailleur 12 can be mounted on a suitable location other than the seat tube such as a hanger tube (bottom bracket tube) 38 or the like. The crank axis A1 is defined by the hanger tube 38. More specifically, the crank axis A1 corresponds to a center longitudinal axis of the hanger tube 38. Thus, the crank axis A1 is the center of rotation of a plurality of (here, three) chain rings 28a, 28b, and 28c. The rear hub axis A2 is defined by a center axis of a rear hub (rear wheel) which is not illustrated in the drawing. Thus, the rear hub axis A2 is the center of rotation of the rear hub.

The front derailleur 12 is configured such that the operation cable 30 exits forwardly from the front derailleur 12 along a cable axis A3. The cable axis A3 extends in the range of an angle α1 in a driving rotation direction (illustrated in FIG. 1 by arrow B) of the chain rings 28a, 28b, and 28c forwardly from a second plane P2 that is perpendicular to a first plane P1 including the rear hub axis A2 and the crank axis A1. Here, the angle cal is 150 degrees. The "driving rotation direction" refers to a rotation direction of the chain rings 28a, 28b, and 28c for driving a chain 36 in an arrow C direction, as described below. In other words, the "driving rotation direction" refers to a rotation direction of the chain rings 28a, 28b, and 28c for moving the bicycle 10 forward.

Figure 2:
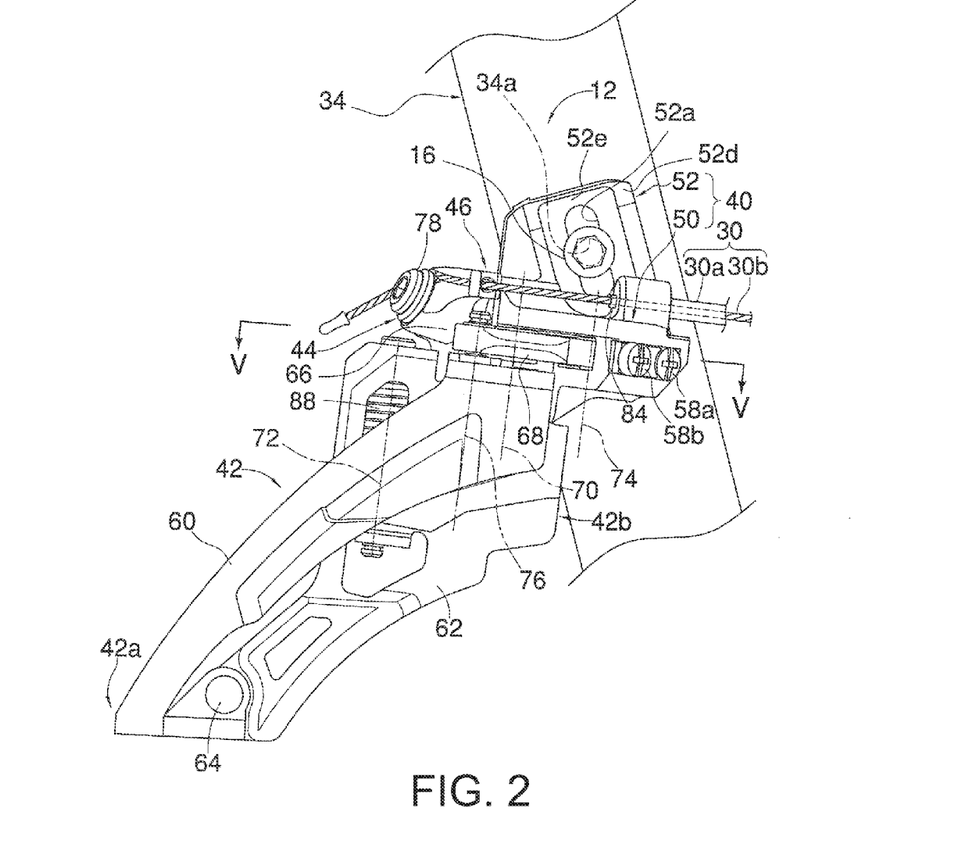
FIG. 2 is an enlarged right side elevational view of the front derailleur in accordance with the illustrated embodiment.

As shown in FIG. 2, the front derailleur 12 includes a base member 40, a chain guide 42, a link mechanism 44 and a cable guiding structure 46. The base member 40 is configured to be detachably fixed to the bicycle 10. The chain guide 42 is configured to guide the chain 36. The link mechanism 44 movably couples the chain guide 42 to the base member 40. In particular, the link mechanism 44 movably couples the chain guide 42 to the base member 40 among a retracted position close to the frame 14, an extended position away from the frame 14 compared to the retracted position, and an intermediate position located between the retracted position and the extended position in response to movement of the inner cable 30b, for example. More specifically, the chain guide 42 is moved relative to the base member 40 in a direction away from the frame 14 by pulling the inner cable 30b. The chain guide 42 is moved relative to the base member 40 in a direction close to the frame 14 by releasing the inner cable 30b. In this way, the chain guide 42 guides the chain 36 to any one of the chain rings 28a, 28b, and 28c in response to the operation of the operation device which is not illustrated in the drawing.

Figure 3:
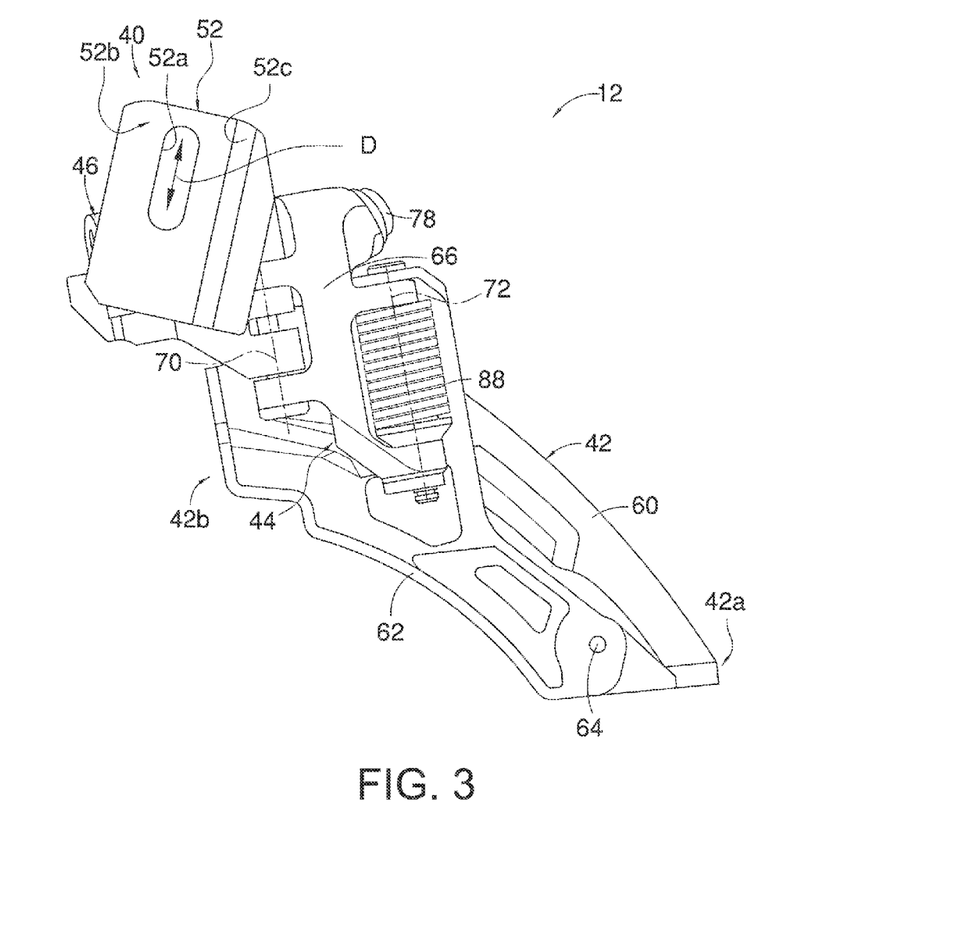
FIG. 3 is an enlarged left side elevational view of the front derailleur in accordance with the illustrated embodiment.
Figure 4:
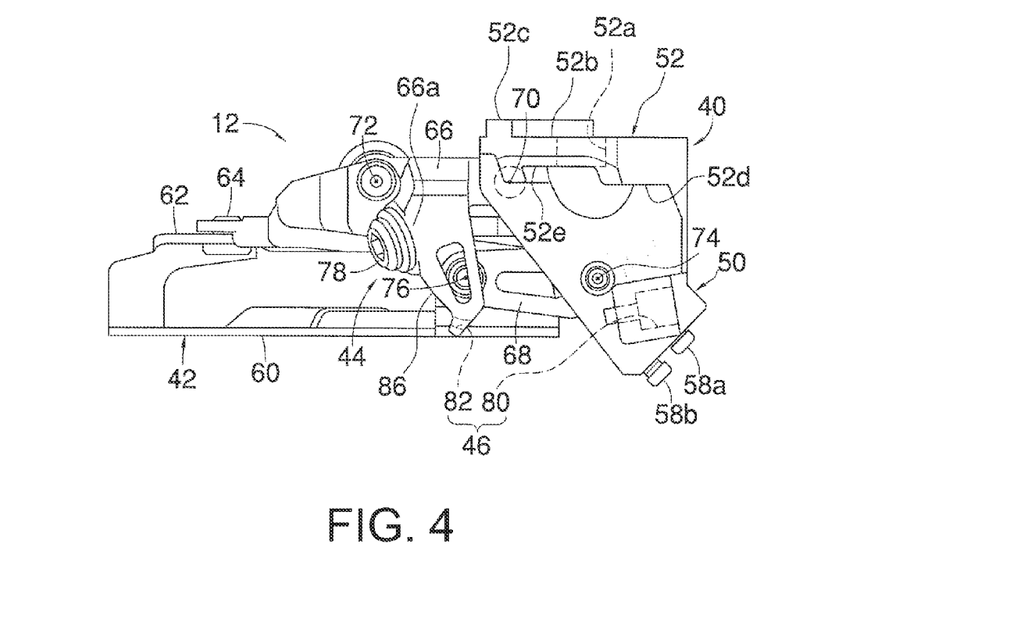
FIG. 4 is an enlarged top plan view of the front derailleur as viewed parallel to the link axes of the links in accordance with the illustrated embodiment.

The base member 40 is attached to the seat tube 34 above the chain guide 42 such that the position of the base member 40 can be adjusted. The position of the base member 40 can be adjusted in a predetermined adjustment direction D along a center axis D1 of the seat tube 34 as illustrated in FIG. 1. In this embodiment, as seen in FIGS. 2, 3 and 4, the base member 40 is fixed by the seat tube 34, in particular, by a fastening member 16 which is fastened to a fixing bore 34a of the seat tube 34. For example, the fixing bore 34a is a screw bore which is formed in an outer surface of the seat tube 34 (for example, on the center axis D1 or in the vicinity thereof). The fastening member 16 is a bolt including a head portion which can be engaged with a tool and a shaft portion (screw shaft portion) which is screwed into the fixing bore 34a.

As shown in FIGS. 2 and 3, the base member 40 includes a link coupling portion 50 and a frame fixing portion 52. The link coupling portion 50 extends from the frame 14 to the left side. The frame fixing portion 52 is formed integrally with the link coupling portion 50, and extends from one side (back side of the paper surface in FIG. 2) of the link coupling portion 50 to a diagonally rearward and upper side. A low position adjustment screw 58a and a top position adjustment screw 58b are formed in a front right end portion of the link coupling portion 50. The low position adjustment screw 58a is configured and arranged to adjust the retracted position of the chain guide 42. The top position adjustment screw 58b is configured and arranged to adjust the extended position of the chain guide 42.

An attaching bore 52a which corresponds to the fixing bore 34a is provided in the frame fixing portion 52. The fastening member 16 is inserted into the attaching bore 52a. The attaching bore 52a is formed as an elongated bore, so that the base member 40 is adjustably fixed in the adjustment direction D. As shown in FIGS. 3 and 4, a protrusion 52c is provided in a first surface (left side surface) 52b which can contact the seat tube 34 in the frame fixing portion 52. The protrusion 52c stops rotation of the base member 40 with respect to the seat tube 34. The protrusion 52c is formed to extend along the adjustment direction D similarly to the attaching bore 52a. The protrusion 52c is arranged in a recessed portion (not illustrated in the drawing) which is provided in the seat tube 34 to extend along the adjustment direction D, and is engaged with the recessed portion such that the base member 40 does not rotate around the fixing bore 34a. As shown in FIG. 2, another recessed portion 52e is formed around the attaching bore 52a in a second surface (right side surface) 52d opposite to the first surface 52b. The head portion of the fastening member 16 is arranged in the recessed portion 52e.

In the front derailleur 12, at least a part of the attaching bore 52a is disposed on the front side and the upper side with respect to the chain guide 42 in a state in which the base member 40 is attached to the seat tube 34 of the frame 14. Here, the "state" is a state in which the front derailleur 12 is attached to the bicycle 10 such that a shift operation can be conducted appropriately in response to movement of the chain guide 42 without causing the chain guide 42 to interfere with the chain rings 28a, 28b, and 28c.

As shown in FIGS. 2 and 3, the chain guide 42 includes a first guide plate (outside/right side guide plate) 60 and a second guide plate (inside/left side guide plate) 62. A chain slot S through which the chain 36 passes is formed between the first guide plate 60 and the second guide plate 62 which are arranged to face each other in a lateral direction (horizontal direction). As described above, the chain guide 42 is movably coupled to the base member 40 by the link mechanism 44 between the retracted position and the extended position. The chain guide 42 has an upstream end 42a and a downstream end 42b. The terms "upstream" and "downstream" as used herein mean with respect to the movement direction of the chain 36 during pedaling. For example, in FIG. 1, the chain 36 moves in the arrow C direction during pedaling. Therefore, the left side in FIG. 1 is upstream and the right side in FIG. 1 is downstream. The first guide plate 60 is bent at the upstream end 42a to extend toward the second guide plate 62, and is coupled to the second guide plate 62 by a rivet 64. Also, the first guide plate 60 and the second guide plate 62 are integrally coupled to each other at the downstream end 42b by a coupling portion which extends in the lateral direction (horizontal direction). The first guide plate 60 contacts an outer surface of the chain 36 and moves in a leftward lateral direction toward the frame 14 such that the chain 36 is moved toward the retracted position. The second guide plate 62 contacts an inner surface of the chain 36 and moves in a rightward lateral direction away from the frame 14 such that the chain 36 is moved toward the extended position.

Figure 5:
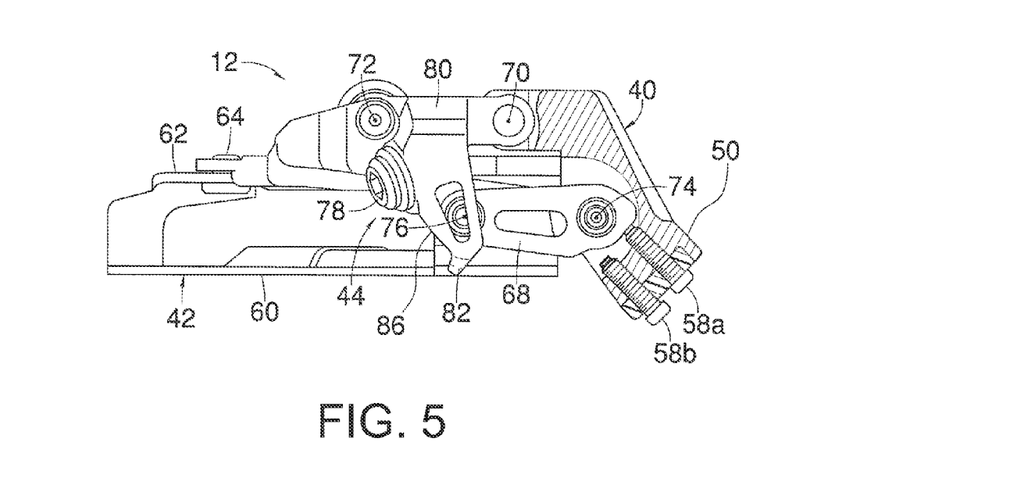
FIG. 5 is a cross-sectional view of the front derailleur as seen along section line V-V of FIG. 2.

As shown in FIGS. 4 and 5, the link mechanism 44 includes a first link member 66 and a second link member 68, and is configured as a four-bar link mechanism together with the base member 40 and the chain guide 42. The first link member 66 pivots about a first link axis 70 with respect to the base member 40 and pivots about a second link axis 72 with respect to the chain guide 42. The first link axis 70 and the second link axis 72 are arranged parallel to each other. The second link member 68 pivots about a third link axis 74 with respect to the base member 40 and pivots about a fourth link axis 76 with respect to the chain guide 42. The third link axis 74 and the fourth link axis 76 are arranged parallel to each other. Further, the first link axis 70, the second link axis 72, the third link axis 74, and the fourth link axis 76 are arranged parallel to each other. The first link axis 70, the second link axis 72, the third link axis 74, and the fourth link axis 76 are substantially vertically arranged in a state in which the front derailleur 12 is attached to the bicycle 10. Further, the first link member 66 is arranged in a position closer to the frame 14 compared to the second link member 68 (arranged on the left side) in a state in which the front derailleur 12 is attached to the bicycle 10.

The first link member 66 includes a cable mounting part 66a. The inner cable 30b is sandwiched by the cable mounting part 66a and a head of a bolt 78 screwed into the cable mounting part 66a, and the inner cable 30b is fixed to the first link member 66. The cable guiding structure 46 is configured to guide the operation cable 30 from the cable mounting part 66a toward a front side of the bicycle 10 with respect to the downstream end 42b of the chain guide 42. The cable guiding structure 46 is disposed in at least one of the base member 40 and the link mechanism 44, as explained below. In either case, preferably, the operation cable 30 is guided to a location further forward as compared to a conventional cable guiding structure in which the operation cable 30 is guided upwardly or downwardly along the seat tube 34.

As shown in FIG. 4, the cable guiding structure 46 includes a first cable guiding part 80 which is formed in the base member 40 and a second cable guiding part 82 which is formed in the link mechanism 44. The first cable guiding part 80 is provided in the link coupling portion 50 of the base member 40 as a through bore. The second cable guiding part 82 is provided in the first link member 66 as a through bore. An insert sleeve 84 is mounted on the first cable guiding part 80 for improving the sliding performance of the inner cable 30b. The first link member 66 includes a projection portion 86 which extends to the right side. The second cable guiding part 82 is provided in the projection portion 86.

The link mechanism 44 further includes a biasing member 88. The biasing member 88 biases the chain guide 42 in one of a retracted position direction and an extended position direction. In the illustrated embodiment, the biasing member 88 is a torsion coil spring which biases the chain guide 42 in the retracted position direction. The biasing member 88 is coaxially arranged with the second link axis 72.

Figure 6:
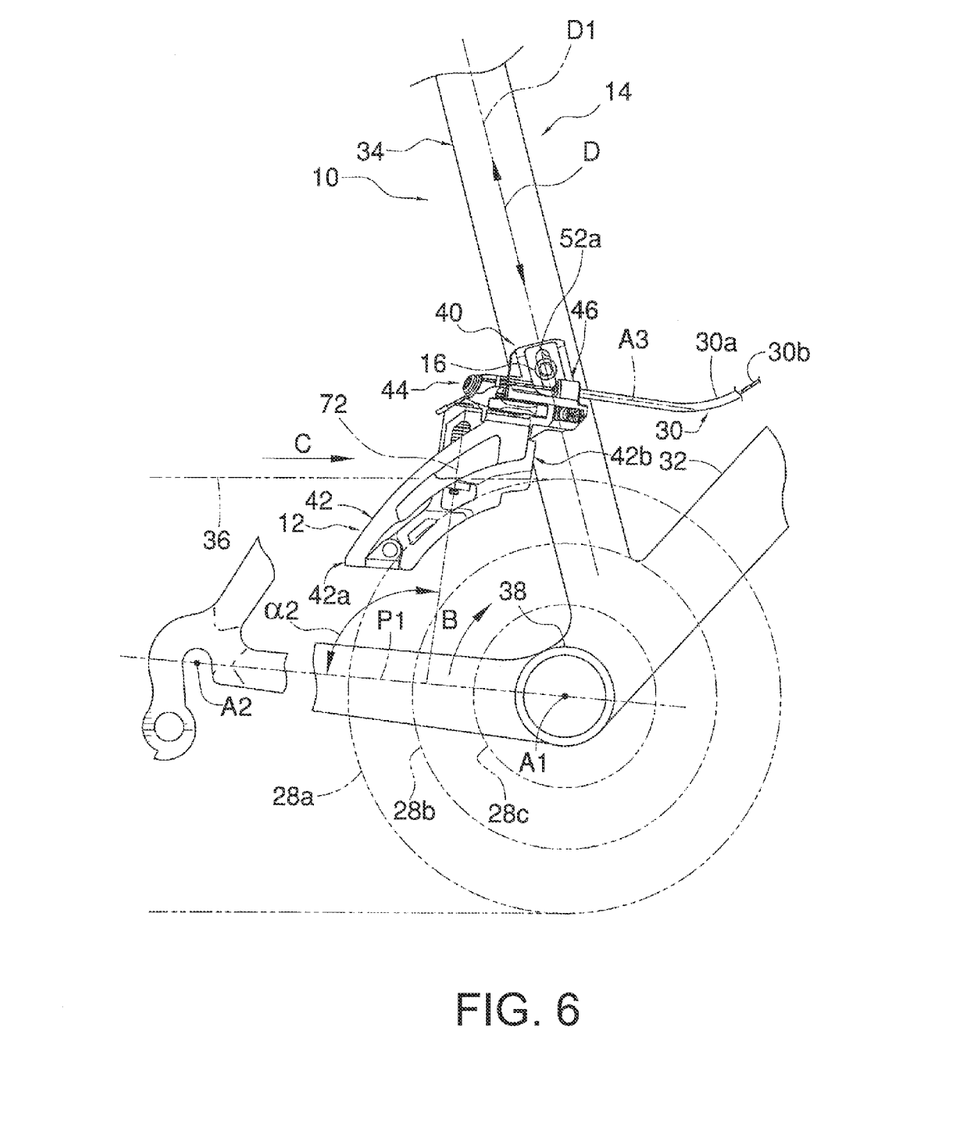
FIG. 6 is a right side elevational view of the bicycle that is equipped with the front derailleur for explaining the relationship between a link axis and a first plane.

As shown in FIG. 6, in the state in which the base member 40 is attached to the bicycle 10, the first link axis 70 is arranged such that an angle α2 is in the range of 80 degrees to 100 degrees with respect to the first plane P1. Namely, the first link axis 70 is arranged to be inclined in the range of 80 degrees to 100 degrees in the driving rotation direction B of the chain rings 28a, 28b, and 28c with respect to the first plane P1 including the rear hub axis A2 and the crank axis A1. More preferably, the angle α2 is set in the range of 85 degrees to 95 degrees. The second link axis 72, the third link axis 74, and the fourth link axis 76 are arranged in the same manner.

As shown in FIG. 2, in the front derailleur 12, at least a part of the attaching bore 52a is disposed on the front side and the upper side with respect to the chain guide 42. In the illustrated embodiment, the entire attaching bore 52a is disposed on the upper side with respect to the chain guide 42, and a part of the attaching bore 52a is disposed on the front side with respect to the chain guide 42. In the front derailleur 12 of the illustrated embodiment, the chain guide 42 moves in the rightward direction and the forward direction in response to movement of the chain guide 42 from the retracted position to the extended position. However, it is sufficient for at least a part of the attaching bore 52a to be located on the front side and the upper side with respect to the chain guide 42 when the chain guide 42 is in the retracted position.

Also, as shown in FIG. 2, in the state in which the base member 40 is attached to the bicycle 10, at least a part of the attaching bore 52a is disposed on the front side and the upper side with respect to the first link axis 70. In the illustrated embodiment, the entire attaching bore 52a is disposed on the front side and the upper side with respect to the first link axis 70, the second link axis 72, and the third link axis 74. Also, in the illustrated embodiment, a part of the attaching bore 52a is disposed on the front side and the upper side with respect to the fourth link axis 76.

Figure 8:
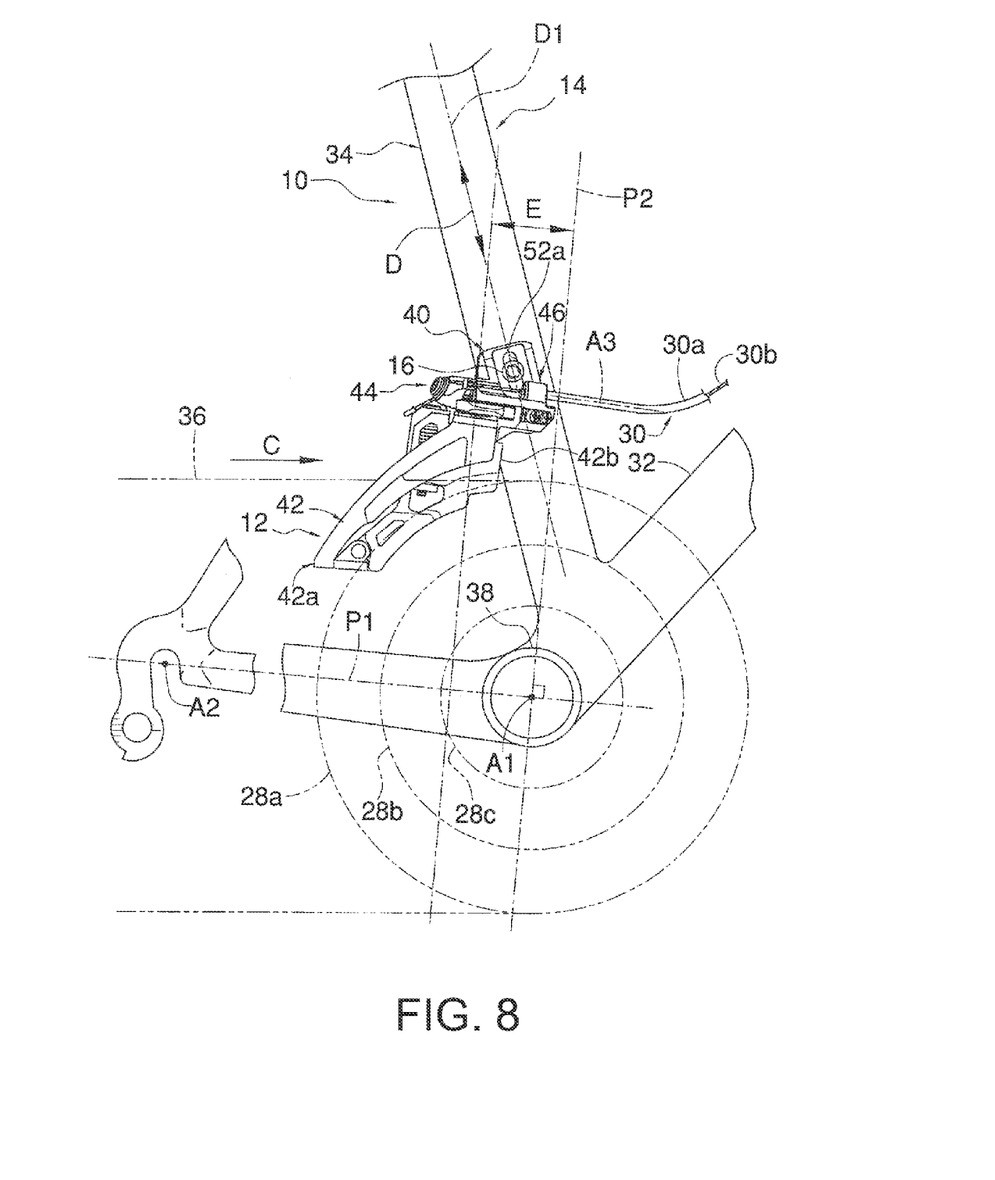
FIG. 8 is an enlarged right side elevational view of the bicycle that is equipped with the front derailleur for explaining the relationship between the attaching hole and a second plane.

Further, as shown in FIG. 8, in the state in which the chain guide 42 does not interfere with the chain rings 28a, 28b, and 28c, the base member 40 is disposed such that the attaching bore 52a is located in the range of 70 degrees to 90 degrees (the range shown by α3) in the driving rotation direction B of the chain rings 28a, 28b, and 28c around the crank axis A1 with respect to the first plane P1. Here, the "state" in which the chain guide 42 does not interfere with the chain rings 28a, 28b, and 28c refers to a state in which the chain guide 42 does not interfere with any one of the chain rings 28a, 28b, and 28c when moving the chain guide 42.

Figure 7:
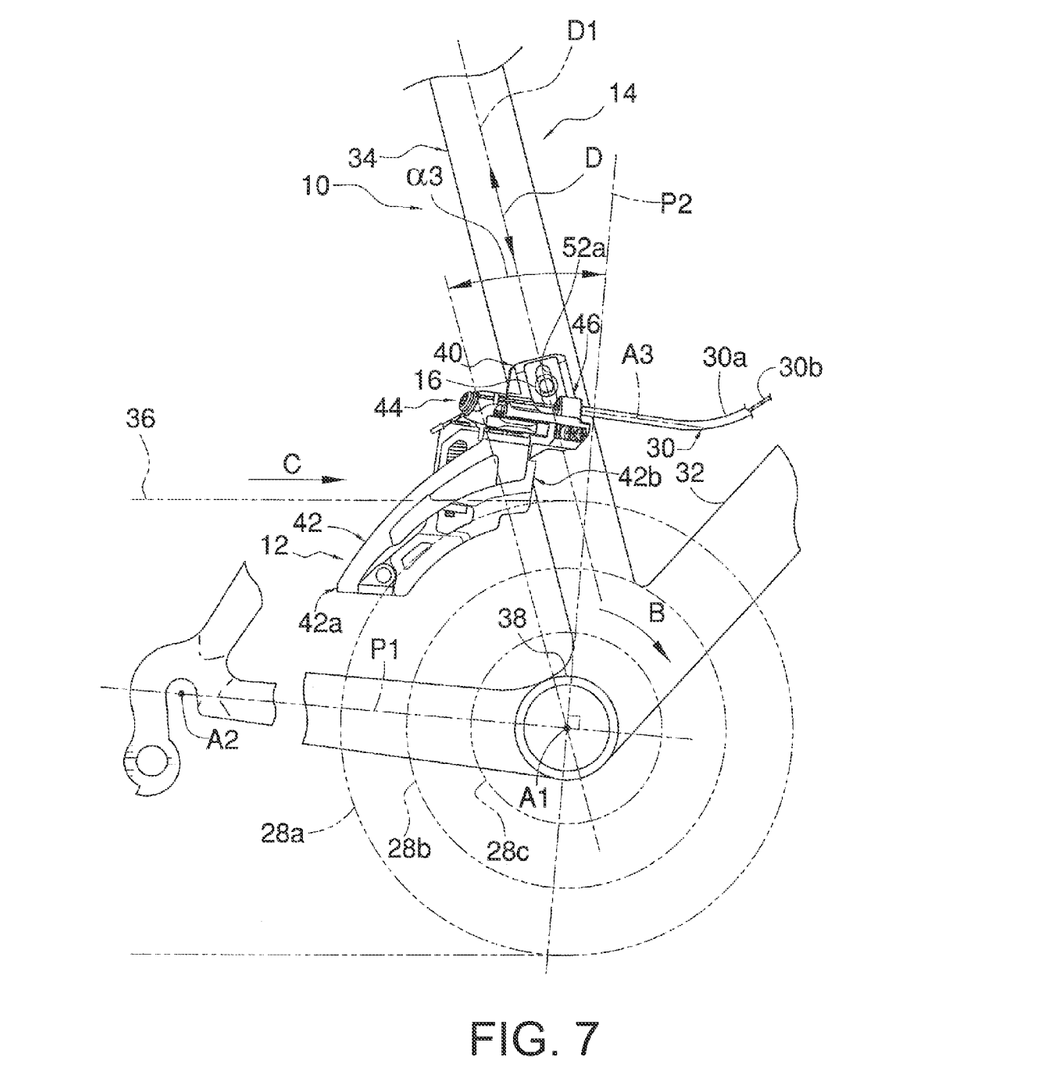
FIG. 7 is an enlarged right side elevational view of the bicycle that is equipped with the front derailleur for explaining the relationship between an attaching hole and the first plane.

Further, as shown in FIG. 7, in the state in which the chain guide 42 does not interfere with the chain rings 28a, 28b, and 28c, the base member 40 is disposed such that the attaching bore 52a is located in the range of a length E rearward of the second plane P2 which is perpendicular to the first plane P1 and includes the crank axis A1. Here, the length E is forty-five millimeters.

With the front derailleur 12 of this configuration, even though the chain guide 42 is disposed in the same position as a chain guide of a conventional front derailleur, the base member 40 can be fixed to the frame 14 at a location further forward as compared to a base member of the conventional front derailleur. Therefore, even when a rear wheel of a large diameter is used, a sufficient space can be obtained between the base member 40 and the rear wheel.

OTHER EMBODIMENTS

While an embodiment of the present invention is explained in the above, the present invention is not limited to the above embodiment, and various modifications can be made herein without departing from the scope of the present invention. In particular, a plurality of embodiments and modified examples described in the present specification can be optionally combined as needed.

(a) In the illustrated embodiment, the link axis is arranged to extend in a substantially vertical direction in a state of being attached to the bicycle. However, the link axis may be arranged to extend in a substantially horizontal direction in a state of being attached to the bicycle.

(b) In the illustrated embodiment, the chain guide 42 is movable to three positions. However, the chain guide 42 may be movable to two positions including the retracted position and the extended position.

(c) In the illustrated embodiment, the front derailleur which is operated by the operation cable is illustrated as an example. However, the present invention is not limited to this, and the present invention can be applied to an electrically-driven front derailleur.

(d) The first link axis and the second link axis do not need to have the same inclination. The third link axis and the fourth link axis do not need to have the same inclination. In particular, only the first link axis and the third link axis are required to have the same inclination, and only the second link axis and the fourth link axis are required to have the same inclination, as long as the present invention uses the four-bar link mechanism.

While only selected embodiments have been chosen to illustrate the present invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents.

What is claimed is:

1. A front derailleur for mounting to a bicycle, the front derailleur comprising:
   a base member having a frame fixing portion and an attaching bore for attaching the base member to a fixing bore of a frame of the bicycle by a fastening member, the frame fixing portion including a first surface and a second surface that is opposite to the first surface, the first surface being configured to face a seat tube of the bicycle in a state in which the base member is attached to the frame, the attaching bore extending through the first surface and the second surface;
   a chain guide configured to guide a chain; and
   a link mechanism movably coupling the chain guide to the base member,
   the base member being disposed with respect to the chain guide such that at least a part of the attaching bore is disposed in front of the chain guide and above the chain guide while the front derailleur is in a state in which the base member is attached to the frame.

2. The front derailleur according to claim 1, wherein the attaching bore is entirely disposed in front of the chain guide and above the chain guide while the front derailleur is in the state in which the base member is attached to the frame.

3. A front derailleur for mounting to a bicycle, the front derailleur comprising:
   a base member having a frame fixing portion and an attaching bore for attaching the base member to a fixing bore of a frame of the bicycle by a fastening member, the frame fixing portion including a first surface and a second surface that is opposite to the first surface, the first surface being configured to face a seat tube of the bicycle in a state in which the base member is attached to the frame, the attaching bore extending through the first surface and the second surface;
   a chain guide configured to guide a chain; and
   a link mechanism movably coupling the chain guide to the base member, the link mechanism including a first link member pivotally arranged about a first link axis with respect to the base member and pivotally arranged about a second link axis with respect to the chain guide, and
   the base member being disposed with respect to the chain guide such that at least a part of the attaching bore is disposed in front of the first link axis and above the first link axis while the front derailleur is in a state in which the base member is attached to the frame.

4. The front derailleur according to claim 3, wherein the attaching bore is at least partially disposed in front of the second link axis and above the second link axis while the front derailleur is in the state in which the base member is attached to the frame.

5. The front derailleur according to claim 3, wherein the link mechanism further includes a second link member pivotally arranged about a third link axis with respect to the base member and pivotally arranged about a fourth link axis with respect to the chain guide.

6. A front derailleur for mounting to a bicycle, the front derailleur comprising:
   a base member having an attaching bore for attaching the base member to a fixing bore of a frame of the bicycle by a fastening member;
   a chain guide configured to guide a chain; and
   a link mechanism movably coupling the chain guide to the base member, the link mechanism including a first link member and a second link member, the first link member being pivotally arranged about a first link axis with respect to the base member and pivotally arranged about a second link axis with respect to the chain guide, the second link member being pivotally arranged about a third link axis with respect to the base member and pivotally arranged about a fourth link axis with respect to the chain guide,
   the base member being disposed with respect to the chain guide such that at least a part of the attaching bore is disposed in front of the first link axis and above the first link axis while the front derailleur is in a state in which the base member is attached to the frame, and
   the attaching bore being at least partially disposed in front of the third link axis and above the third link axis while the front derailleur is in the state in which the base member is attached to the frame.

7. The front derailleur according to claim 6, wherein the attaching bore is at least partially disposed in front of the fourth link axis and above the fourth link axis while the front derailleur is in the state in which the base member is attached to the frame.

8. The front derailleur according to claim 7, wherein the attaching bore is entirely disposed in front of the chain guide and above the first, second and third link axes while the front derailleur is in the state in which the base member is attached to the frame.

9. The front derailleur according to claim 7, wherein the first, second, third and fourth link axes are arranged to be inclined in a range of 80 degrees to 100 degrees in a chain ring driving rotation direction with respect to a first plane that includes a rear hub axis and a crank axis while the front derailleur is in the state in which the base member is attached to the frame.

10. The front derailleur according to claim 9, wherein the first, second, third and fourth link axes have the same angle with respect to the first plane.

11. The front derailleur according to claim 4, wherein the link mechanism further includes a second link member pivotally arranged about a third link axis with respect to the base member and pivotally arranged about a fourth link axis with respect to the chain guide.

12. A front derailleur for mounting to a bicycle, the front derailleur comprising:
- a base member having an attaching bore for attaching the base member to a fixing bore of a frame of the bicycle by a fastening member;
- a chain guide configured to guide a chain; and
- a link mechanism movably coupling the chain guide to the base member, the link mechanism including a first link member and a second link member, the first link member being pivotally arranged about a first link axis with respect to the base member and pivotally arranged about a second link axis with respect to the chain guide, the second link member being pivotally arranged about a third link axis with respect to the base member and pivotally arranged about a fourth link axis with respect to the chain guide,
- the base member being disposed with respect to the chain guide such that at least a part of the attaching bore is disposed in front of the first link axis and above the first link axis while the front derailleur is in a state in which the base member is attached to the frame,
- the attaching bore being at least partially disposed in front of the second link axis and above the second link axis while the front derailleur is in the state in which the base member is attached to the frame, and
- the attaching bore being at least partially disposed in front of the third link axis and above the third link axis while the front derailleur is in the state in which the base member is attached to the frame.

13. The front derailleur according to claim 12, wherein the attaching bore is at least partially disposed in front of the fourth link axis and above the fourth link axis while the front derailleur is in the state in which the base member is attached to the frame.

14. The front derailleur according to claim 13, wherein the attaching bore is entirely disposed in front of the chain guide and above the first, second and third link axes while the front derailleur is in the state in which the base member is attached to the frame.

15. The front derailleur according to claim 13, wherein the first, second, third and fourth link axes are arranged to be inclined in a range of 80 degrees to 100 degrees in a chain ring driving rotation direction with respect to a first plane that includes a rear hub axis and a crank axis while the front derailleur is in the state in which the base member is attached to the frame.

16. The front derailleur according to claim 15, wherein the first, second, third and fourth link axes have the same angle with respect to the first plane.

17. A front derailleur for mounting to a bicycle, the front derailleur comprising:
- a base member having a frame fixing portion and an attaching bore for attaching the base member to a fixing bore of a frame of the bicycle by a fastening member, the frame fixing portion including a first surface and a second surface that is opposite to the first surface, the first surface being configured to face a seat tube of the bicycle in a state in which the base member is attached to the frame, the attaching bore extending through the first surface and the second surface;
- a chain guide configured to guide a chain; and
- a link mechanism movably coupling the chain guide to the base member,
- the base member being disposed with respect to the chain guide such that the attaching bore is located in a range of 70 degrees to 90 degrees in a chain ring driving rotation direction around a crank axis with respect to a first plane including a rear hub axis and a crank axis while the front derailleur is in a state in which the base member is attached to the frame and in which the chain guide does not interfere with a chain ring rotatably disposed on the crank axis.

18. A front derailleur for mounting to a bicycle, the front derailleur comprising:
- a base member having a frame fixing portion and an attaching bore for attaching the base member to a fixing bore of a frame of the bicycle by a fastening member, the frame fixing portion including a first surface and a second surface that is opposite to the first surface, the first surface being configured to face a seat tube of the bicycle in a state in which the base member is attached to the frame, the attaching bore extending through the first surface and the second surface;
- a chain guide configured to guide a chain; and
- a link mechanism movably coupling the chain guide to the base member,
- the base member being disposed with respect to the chain guide such that the attaching bore is located in a range of forty-five millimeters or less rearward of a second plane which is perpendicular to a first plane that includes a rear hub axis and a crank axis while the front derailleur is in a state in which the base member is attached to the frame and in which the chain guide does not interfere with a chain ring rotatably disposed on the crank axis.

* * * * *